(12) United States Patent
Shumarayev et al.

(10) Patent No.: US 7,639,993 B1
(45) Date of Patent: Dec. 29, 2009

(54) POWER SUPPLY CIRCUITRY FOR DATA SIGNAL TRANSCEIVERS ON INTEGRATED CIRCUITS

(75) Inventors: Sergey Yuryevich Shumarayev, San Leandro, CA (US); Rakesh Patel, Cupertino, CA (US); William Bereza, Nepean (CA); Wilson Wong, San Francisco, CA (US); Tim Tri Hoang, San Jose, CA (US)

(73) Assignee: Altera Corporation, San Jose, CA (US)

( * ) Notice: Subject to any disclaimer, the term of this patent is extended or adjusted under 35 U.S.C. 154(b) by 857 days.

(21) Appl. No.: 11/295,391

(22) Filed: Dec. 5, 2005

Related U.S. Application Data

(60) Provisional application No. 60/712,027, filed on Aug. 26, 2005.

(51) Int. Cl.
H04B 1/04 (2006.01)
(52) U.S. Cl. ............... 455/127.1; 455/13.4; 455/343.1; 455/572
(58) Field of Classification Search ............. 455/127.1, 455/13.4, 343.1, 572, 343.6, 571, 73, 550.1, 455/333, 522, 573
See application file for complete search history.

(56) References Cited

U.S. PATENT DOCUMENTS

| | | | |
|---|---|---|---|
| 5,719,779 A * | 2/1998 | Shuler et al. ............... 700/231 |
| 6,650,140 B2 | 11/2003 | Lee et al. |
| 6,724,328 B1 | 4/2004 | Lui et al. |
| 6,750,675 B2 | 6/2004 | Venkata et al. |
| 6,854,044 B1 | 2/2005 | Venkata et al. |
| 6,870,462 B1 * | 3/2005 | Andersson ............... 340/10.34 |
| 6,970,690 B2 * | 11/2005 | Yajima et al. ............ 455/343.1 |
| 7,076,124 B2 * | 7/2006 | Abrams et al. ............. 385/14 |
| 7,313,176 B1 * | 12/2007 | Groen ........................ 375/219 |
| 7,359,643 B2 * | 4/2008 | Aronson et al. ............ 398/136 |
| 7,412,122 B2 * | 8/2008 | Abrams et al. ............. 385/14 |
| 2006/0177174 A1 * | 8/2006 | Abrams et al. ............. 385/14 |
| 2006/0264747 A1 * | 11/2006 | Freeman et al. ............ 600/437 |
| 2007/0285121 A1 * | 12/2007 | Park et al. ................... 326/30 |
| 2008/0119142 A1 * | 5/2008 | Dupuis ..................... 455/67.15 |

* cited by examiner

*Primary Examiner*—Pablo N Tran
(74) *Attorney, Agent, or Firm*—Brian E. Mack; Ropes & Gray LLP

(57) ABSTRACT

The various components of transceiver circuitry on an integrated circuit are put together in various ways for purposes of being supplied with power to help prevent noise propagation between the groups. In the case of multi-channel transceiver circuitry there can be various amounts of power supply sharing between similar groups in multiple channels.

19 Claims, 5 Drawing Sheets

POWER SUPPLY CIRCUITRY FOR DATA SIGNAL TRANSCEIVERS ON INTEGRATED CIRCUITS

This application claims the benefit of U.S. provisional patent application No. 60/712,027, filed Aug. 26, 2005, which is hereby incorporated by reference herein in its entirety.

BACKGROUND OF THE INVENTION

There is increasing interest in using high-speed serial data signaling for communication among devices such as integrated circuits. Some protocols for such communication require the use of several serial channels in parallel. Each channel may include several components that are very sensitive to noise in their power supply signals. One possible way to address this problem is to provide a separate power supply for each such noise-sensitive component. However, this can lead to a requirement for unacceptably large numbers of separate power supplies, especially for devices having large numbers of channels for high-speed serial communication.

An additional problem that may arise in integrating high-speed serial transceivers into programmable logic devices ("PLDs") and similar circuitry is the need to separate PLD logic power supplies and their associated noise from sensitive analog power supplies of the transceivers.

SUMMARY OF THE INVENTION

In order to avoid noise contamination between various parts of data signal transceiver circuitry, a first power supply is provided for receiver path components of the circuitry, a second power supply is provided for transmitter path components of the circuitry with the exception of the transmitter driver, and a third power supply is provided for the transmitter driver.

If there are multiple transceiver channels and it is desired to have more than one channel share the above-mentioned power supplies to some extent, then a fourth power supply may be provided for a particularly sensitive component in the receiver path of each transceiver channel. For example, this may be done by integrating a regulator for the power supply for that particularly sensitive component.

Further features of the invention, its nature and various advantages will be more apparent from the accompanying drawings and the following detailed description.

DETAILED DESCRIPTION

Figure 1:
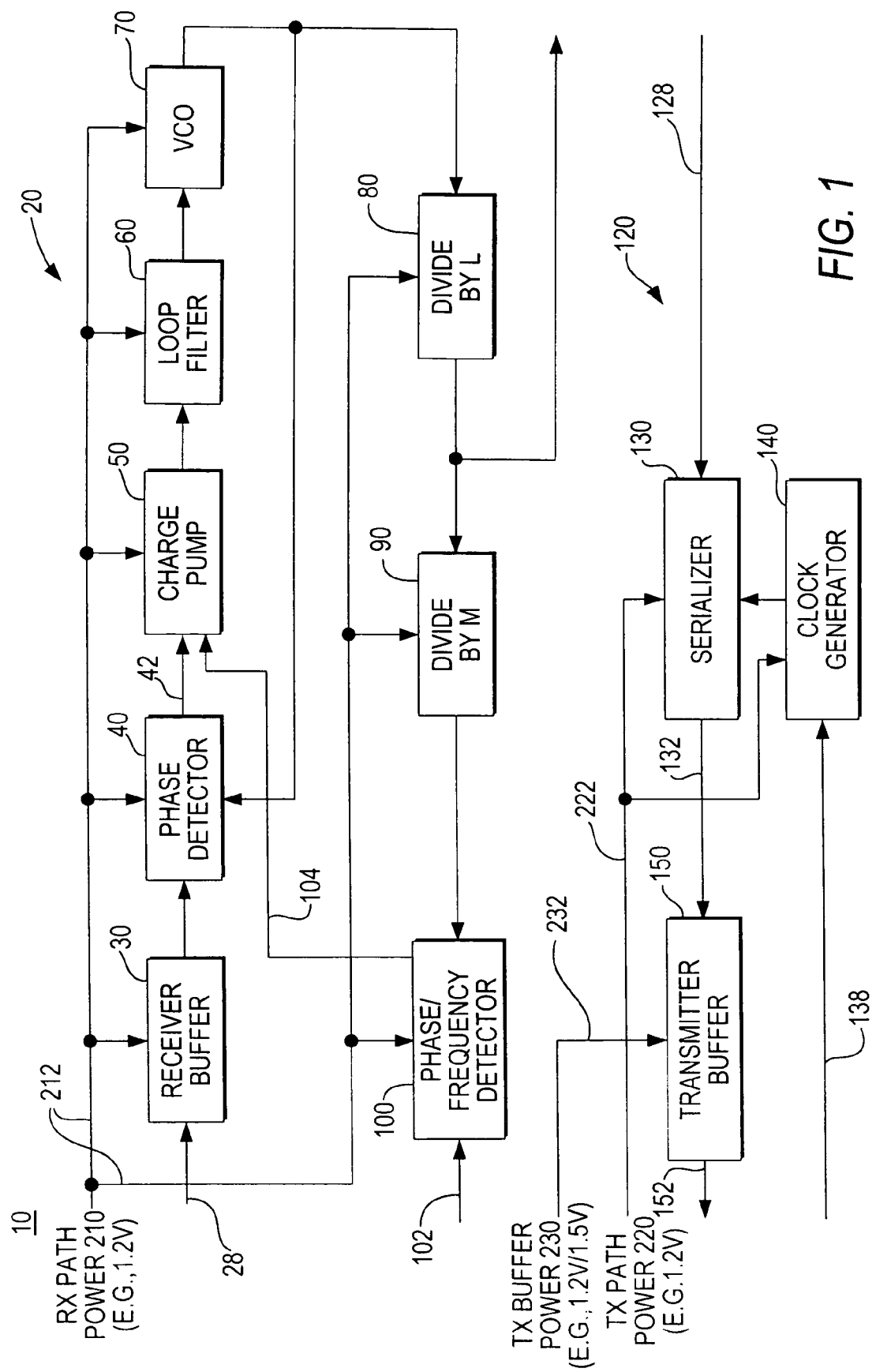
FIG. 1 is a simplified block diagram of an illustrative embodiment of circuitry in accordance with the invention.

Illustrative transceiver circuitry 10 for one channel of high-speed serial data communication is shown (in pertinent part) in FIG. 1. Additional background information about certain aspects of circuitry of this general kind can be found in references such as Aung et al. U.S. patent application Ser. No. 09/805,843, filed Mar. 13, 2001, Lee et al. U.S. Pat. No. 6,650,140, Venkata et al. U.S. Pat. No. 6,750,675, Venkata et al. U.S. Pat. No. 6,854,044, Lui et al. U.S. Pat. No. 6,724,328, Venkata et al. U.S. patent application Ser. No. 10/317,264, filed Dec. 10, 2002, Venkata et al. U.S. patent application Ser. No. 10/637,982, filed Aug. 8, 2003, Lam et al. U.S. patent application Ser. No. 10/621,074, filed Jul. 15, 2003, Venkata et al. U.S. patent application Ser. No. 10/670,813, filed Sep. 24, 2003, Shumarayev U.S. patent application Ser. No. 11/211,989, filed Aug. 24, 2005, and Shumarayev et al. U.S. patent application Ser. No. 11/230,002, filed Sep. 19, 2005.

Transceiver circuitry 10 includes receiver portion 20 and transmitter portion 120. Receiver portion 20 includes receiver buffer 30, which receives a high-speed serial data signal 28 and strengthens it for further processing. Receiver portion 20 also includes phase/frequency detector ("PFD") circuitry 100. PFD 100 receives a reference clock signal 102, which has frequency related to the data rate of signal 28, but no necessary phase relationship to the phase of transitions in signal 28. PFD 100 works with an output signal of voltage-controlled oscillator ("VCO") 70 (after frequency division by L and M in components 80 and 90, respectively) to produce an "error" signal or signals 104 indicative of whether the frequency of VCO 70 should be increased or decreased to better match the frequency and phase of reference clock signal 102. Signal 104 is one input to charge pump circuitry 50.

Another input to charge pump circuitry 50 is the output signal 42 of phase detector circuitry 40. Circuitry 40 receives the serial data signal output by receiver buffer 30 and compares the phase of transitions in that signal to the phase of transitions in the output signal of VCO 70. The output signal 42 of circuitry 40 is another "error" signal indicative of whether the frequency of VCO 70 needs to be increased or decreased to produce a better phase match between the signals applied to circuitry 40.

Charge pump circuitry 50 effectively integrates over time the error signals 42 and 102 it receives and produces an output signal of a type that can be used to control the frequency of VCO 70. Loop filter circuitry 60 may somewhat smooth the output signal of charge pump 50 prior to application of that signal to VCO 70 (e.g., to help avoid excessive "hunting" by VCO 70).

Although not shown in FIG. 1, the following is mentioned for general completeness. An output signal of VCO 70 (or a signal derived from such an output signal) can be used to periodically sample the serial data output signal of receiver buffer 30. The phasing of this sampling is preferably selected to produce the most reliable samples of the received serial data. The output signal of this sampling operation is a retimed serial data signal. The sampling signal or a signal related to the sampling signal can be a recovered clock signal. The retimed serial data signal can be converted to successive bytes of parallel data, which can be passed on to other circuitry for further processing. For example, that other circuitry may be other circuitry on the integrated circuit that includes transceiver 10. In the case of a PLD or the like, the above-mentioned other circuitry may include programmable, core, logic circuitry of the device.

On the transmitter side, circuitry 10/120 may include serializer circuitry 130, which can convert parallel data 128 to a serial data signal 132. Parallel data 128 may come from other circuitry on the integrated circuit that includes transceiver circuitry 10. For example, that other circuitry may include core logic circuitry in the case of a PLD or other similar device. To perform its task, serializer 130 may employ one or more clock signals from clock generator circuitry 140, which may operate on another reference clock signal 138. The serial data output signal 132 of serializer 130 is applied to output driver 150, which produces the final serial data output signal 152 that is driven off the device.

It will be understood that circuitry of the type shown in FIG. 1 may be used for very high-speed serial data signals. For example, signal 28 may have a serial data rate in the range from 600 Mbps (600 mega-bits per second) to 6 Gbps (6 giga-bits per second). At data rates such as these, it can be difficult to accurately recover the data from the incoming signal. Power supply noise, especially for certain key components, can interfere with accurate data recovery.

It will also be understood that the transceiver circuitry 10 shown in FIG. 1 may be only one representative instance of several instances of such circuitry on an integrated circuit. For example, an integrated circuit may have four instances of such circuitry for supporting communication protocols that require up to four channels of serial data communication. Other examples of possible numbers of channels 10 on an integrated circuit include eight channels, 12 channels, 16 channels, 20 channels, or any other number of channels.

Figure 5:
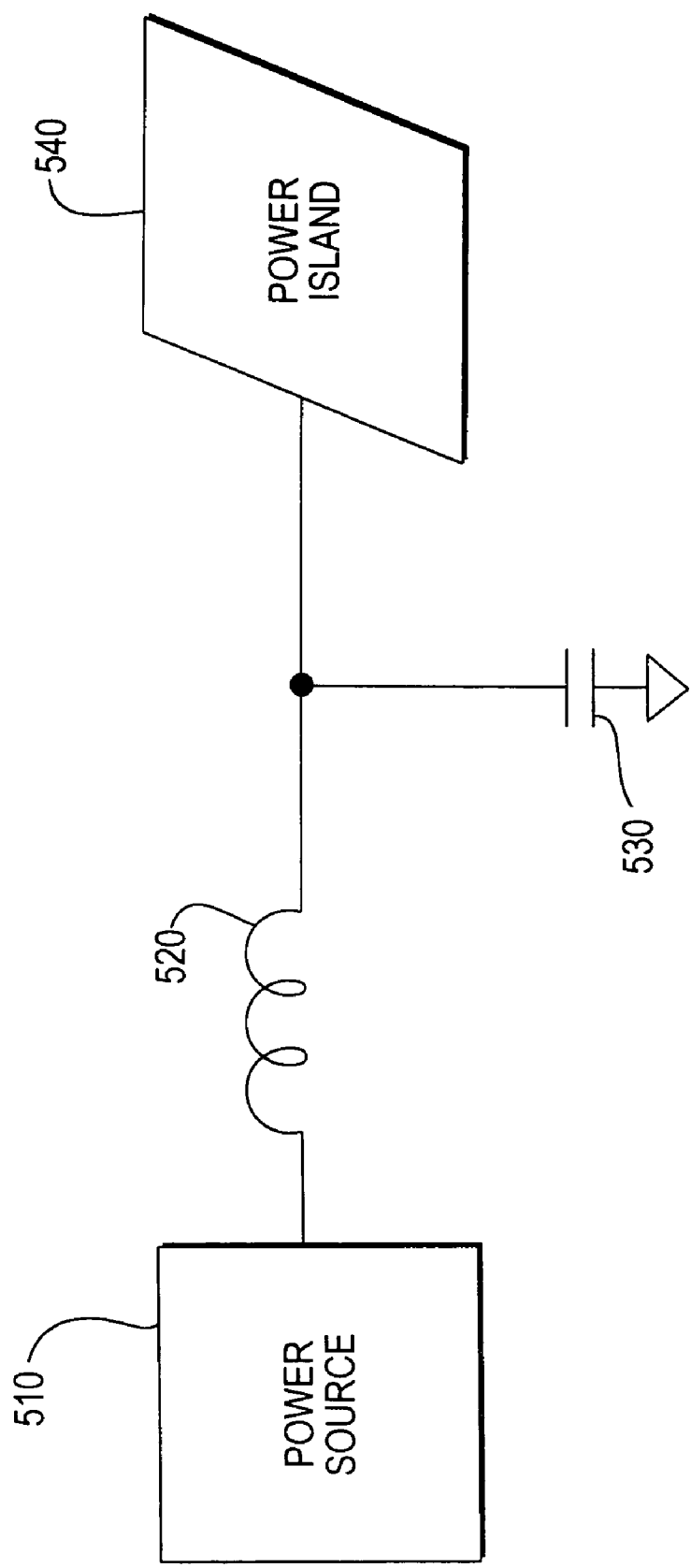
FIG. 5 is a simplified schematic block diagram of an illustrative embodiment of circuitry that can be used for certain components in other FIGS. in accordance with the invention.

FIG. 1 also shows an illustrative embodiment of circuitry for supplying power to various FIG. 1 circuit components in accordance with this invention. Consider a system in which external regulators and multiple ferrite beads for individual sensitive power supplies are required. (As shown in FIG. 5, a ferrite bead 520 is an inductor that is placed between a common power plane 510 and an individual power island 540. This is done to prevent noise from entering a given power island from a common, shared power plane. Ferrite beads are usually configured to choke starting from a specific frequency so that DC power is passed through but noise (an AC) is blocked. They are typically placed on the printed circuit board, commonly with an associated capacitor 530. Those skilled in the art will appreciate that for numerous individual sensitive power supplies, the board space required for individual ferrite beads and associated capacitors can become quite large. In addition, the routing to and from these many components can be a problem.) At a high level of integration, multiple transceivers 10 are part of an integrated circuit such as a PLD. Each transceiver has several such power supplies. For example, receiver ("RX") path power should be separated from transmitter ("TX") path power, because each of them can run on independently and hence noise travelling through such a supply would be uncorrected and therefore detrimental to proper operation at low bit error rate ("BER"). In addition, TX driver 150 is frequently the most violent noise injector because it may be required to drive the large load of long back planes and therefore requires large voltage swings that generate significant noise.

Based on the foregoing, it is desirable for each channel 10 to have three separate power supplies. These are (1) RX path power (for RX buffer 30, phase detector 40, charge pump 50, loop filter 60, VCO 70, PFD 100, and internal dividers 80 and 90), (2) TX path power (for serializer 130 and clock generator 140), and (3) TX driver 150 power. This arrangement is shown in FIG. 1.

As FIG. 1 shows, power from RX path power supply 210 is distributed via conductor network 212 to elements 30, 40, 50, 60, 70, 80, 90, and 100. Similarly, power from TX path power supply 220 is distributed via conductor network 222 to elements 130 and 140. And power from TX driver power supply 230 is applied to TX driver 150 via conductor 232. Note that in addition to separate power supplies 210, 220, and 230, there may be one or more other separate power supplies (not shown) for other parts of the integrated circuit (also not shown). For example, there may be a separate power supply for the core logic circuitry of a PLD.

The arrangement shown in FIG. 1 is good in the case of a few integrated channels 10. However, if the number of channels 10 increases, the number of individual power supplies may become too large to be practical on the associated circuit board. For example, with 20 integrated transceivers 10 on a PLD, the number of separate power supplies is 60 based on the FIG. 1 scheme. This does not include any central phase-locked loop ("PLL") considerations. (This last point refers to the possibility that several channels 10 may share some common PLL circuitry, e.g., for such purposes as receiving an external reference clock signal, cleaning up and possibly also modifying that external signal in some respects, and supplying the resulting signal(s) for such purposes as are served by signals 102 and 138 in FIG. 1. Such PLL circuitry may need one or more additional power supplies.) It may be possible to simply reduce the number of power supplies by employing shared regulators with individual ferrite beads for each such power supply. Although this may be practical with respect to the number of regulators, one still has to be concerned about the number of unique power supplies and required individual de-coupling and regulating.

Figure 2:
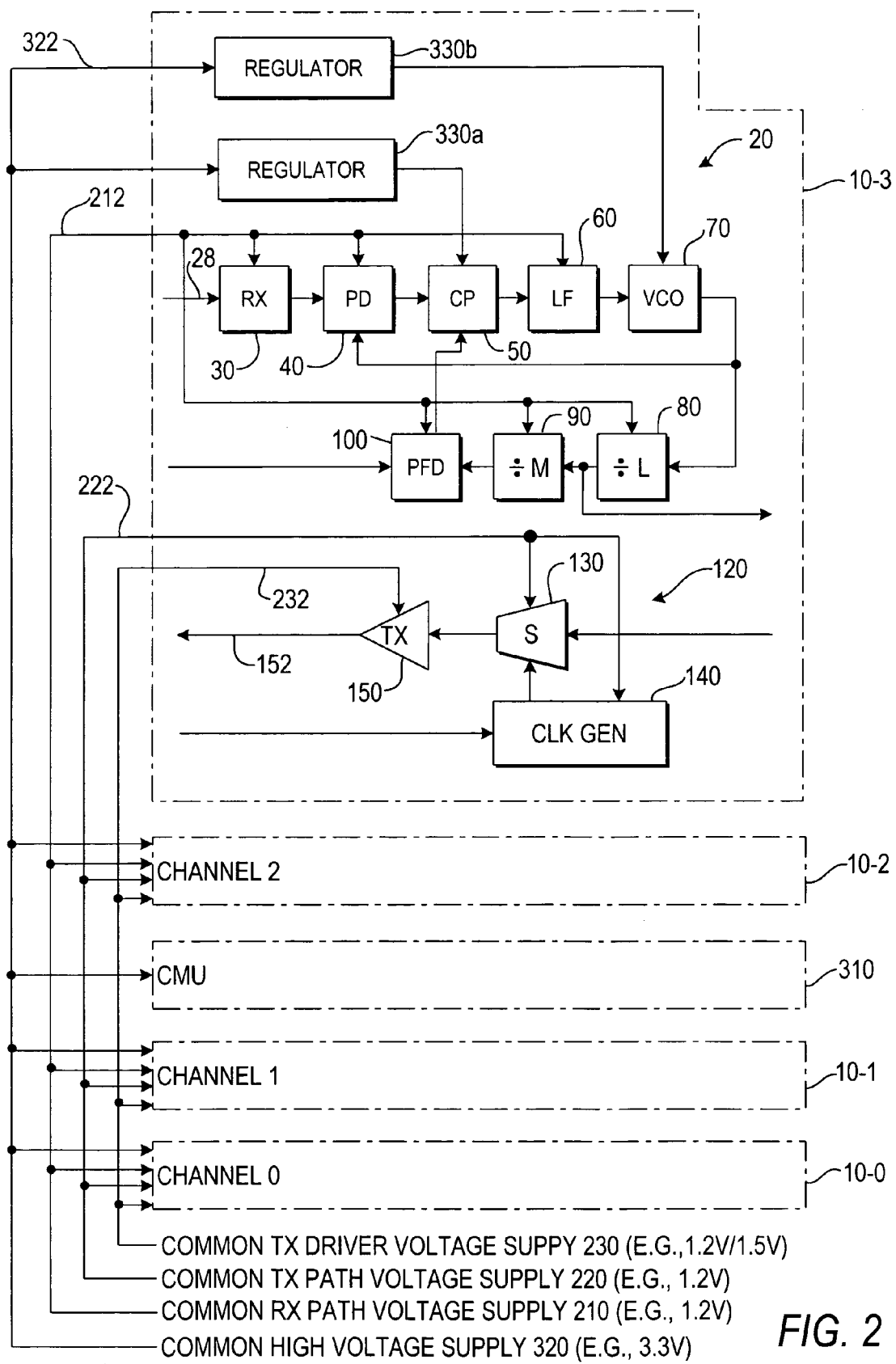
FIG. 2 is a simplified block diagram of an illustrative embodiment of additional circuitry in accordance with the invention.

FIG. 2 shows an illustrative alternative embodiment in accordance with the invention that addresses issues of the kind just mentioned. FIG. 2 shows four transceiver channels 10-0 through 10-3 adjacent to one another on an integrated circuit such as a PLD. FIG. 2 also shows clock multiplier or management unit ("CMU") circuitry 310 that is shared by the four depicted channels 10. For example, CMU circuitry 310 may perform functions such as those described in the above discussion of central PLLs.

Each of channels 10 in FIG. 2 may be similar to channel 10 in FIG. 1, except that in FIG. 2 each channel includes two separate but integrated power supply regulator circuits 330*a* and 330*b*. Regulator 330*a* supplies regulated power to charge pump 50 from common high voltage supply 320 and distribution conductor network 322. Regulator 330*b* supplies regulated power to VCO 70 from elements 320 and 322. All of the components 330 in the four channels 10 shown in FIG. 2 get their power from the same power supply 320. The CMU 310 shared by those four channels 10 may also get its power from that power supply 320.

Regular or native NMOS transistors can be used to provide each of regulators 330. As another example, each of regulators 330 can be an active filter.

The other RX path circuit elements (e.g., 30, 40, 60, 80, 90, and 100) in all four channels 10 shown in FIG. 2 get their power from common RX path voltage supply 210 and distribution conductor network 212. The TX path circuit elements 130 and 140 in all four channels 10 shown in FIG. 2 get their power from common TX path voltage supply 220 and distribution conductor network 222. The TX drivers 150 in all four channels shown in FIG. 2 get their power from common TX driver voltage supply 230 and distribution conductor network 232.

From the foregoing it will be seen that the arrangement shown in FIG. 2 provides for each channel 10 to have three individual power supplies as in FIG. 1. In addition, each channel 10 now has two internal regulators 330. One is for VCO 70 and the other is for charge pump 50. These regulators impart the following advantages. First, regulators 330*b* separate each VCO 70 from any other VCO, thereby allowing external supply sharing. Second, regulators 330*a* separate each charge pump 50 from any other charge pump, thereby again allowing external supply sharing. Third, regulators 330 allow use of thicker oxides for either VCOs 70 and/or charge pumps 50, thereby extending the operating voltage ranges of those components. Fourth, regulators 330 prevent noise injection or pick up by each individual module 50 or 70.

Another advantage of the FIG. 2 arrangement is that RX powers 210/212 are allowed to be shared between channels 10 after the sensitive parts such as VCOs 70 and charge pumps 50 are removed. Similarly, TX power paths 220/222 are grouped from channel to channel, but not TX drivers 150. Sharing separate TX driver supply 230/232 allows isolation of TX aggressors from possible victims such as RX paths and the pre-drivers of other TX drivers. This handling of TX driver power supply and distribution also allows different groups of channels 10 to share TX driver power supplies 230 having different voltages. For example, one bank of channels 10 can have a 1.2V TX driver power supply 230, while another bank of channels 10 can have a 1.5V TX driver power supply.

Overall, the sharing scheme shown in FIG. 2 has the ability to reduce 60 individual power supplies for 20 channels 10 to a number more like 15 (three for each of five groups of four channels). It may be possible for all 20 channels to share one 3.3V rail 320/322 with the aid of regulators 330.

Figure 3:
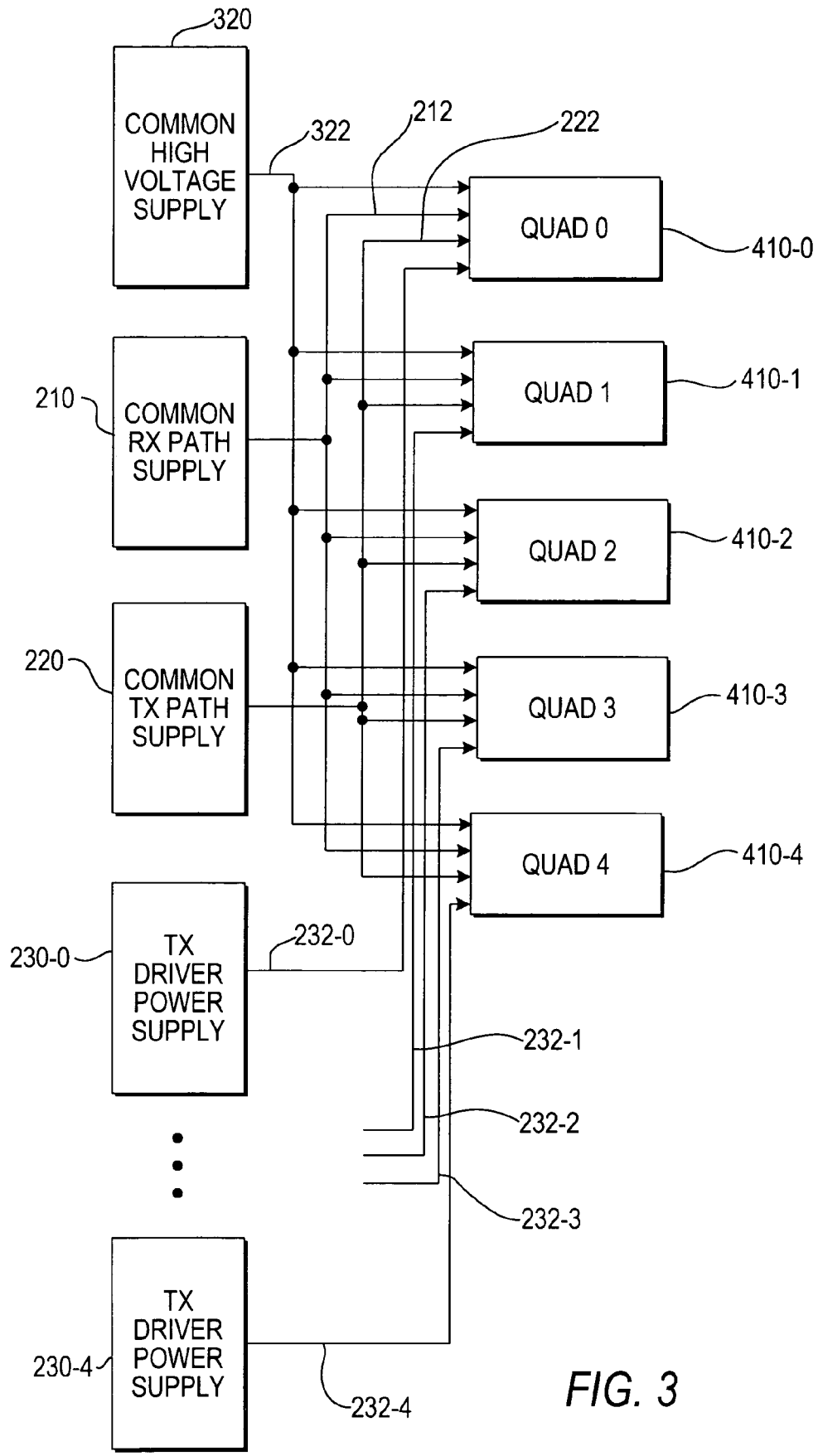
FIG. 3 is a simplified block diagram of an illustrative embodiment of still more circuitry in accordance with the invention.
Figure 4:
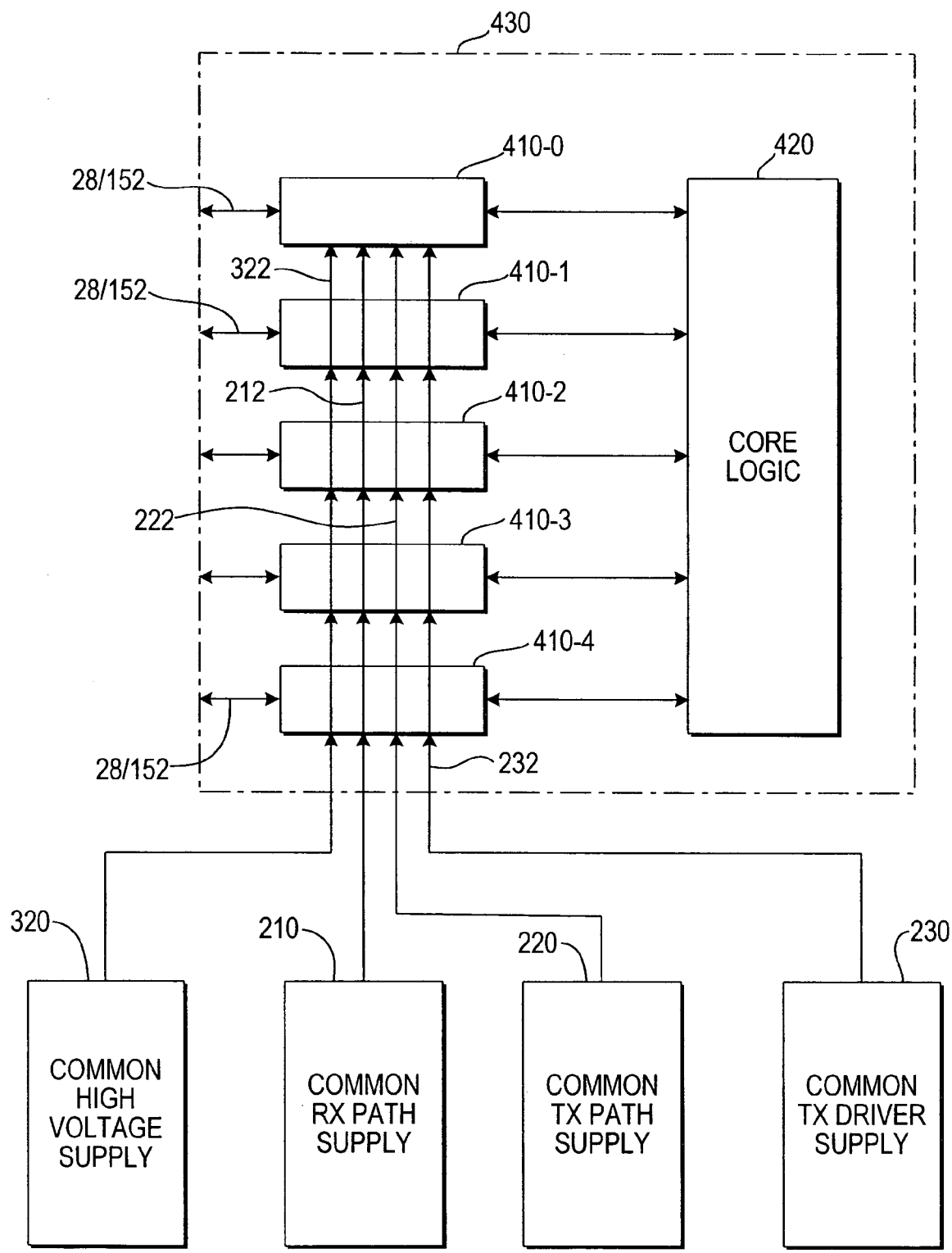
FIG. 4 is a simplified block diagram of an illustrative embodiment of still further circuitry in accordance with the invention.

Still further reduction may be possible as shown in FIG. 3. In this embodiment, 20 channels 10 have (1) one shared 3.3V supply 320/322, (2) one shared RX path supply 210/212, (3) one shared TX path supply 220/222, and (4) five TX driver power banks of four channels each 230-0 through 230-4 and 232-0 through 232-4. In FIG. 3 an instance of circuitry 10-0 through 10-3 and 310 as shown in FIG. 2 is referred to as a quad 410, and there are five instances of such quads 410-0 through 410-4 in FIG. 3. If all of TX drivers 150 are restricted to one voltage level, then item (4) above may be further reduced to one TX driver power supply 230/232 as in the illustrative embodiment shown in FIG. 4. For completeness, FIG. 4 also shows more of an example of a full integrated circuit employing the invention. In the illustrative embodiment shown in FIG. 4, integrated circuit 430 is a PLD including quads 410-0 through 410-4 and core logic circuitry 420. Power supplies 210, 220, 230 and 320 are external to integrated circuit 430.

It will be understood that the foregoing is only illustrative of the principles of the invention, and that various modifications can be made by those skilled in the art without departing from the scope and spirit of the invention. For example, the various frequencies and voltages mentioned herein are only illustrative, and other frequencies and voltages can be used instead if desired. As another example, the various numbers of channels 10 shown and mentioned above are only illustrative, and other numbers of channels (both overall and in various subgroups) can be different from those shown and mentioned.

The invention claimed is:

1. Transceiver circuitry comprising:
    receiver circuitry, wherein the receiver circuitry comprises voltage-controlled oscillator circuitry;
    transmitter circuitry including transmitter driver circuitry;
    first power supply circuitry for supplying power to the receiver circuitry;
    second power supply circuitry for supplying power to the transmitter circuitry other than the transmitter driver circuitry;
    third power supply circuitry for supplying power to the transmitter driver circuitry;
    fourth power supply circuitry for supplying power to the voltage-controlled oscillator circuitry.

2. The circuitry defined in claim 1 wherein the receiver circuitry and the transmitter circuitry are integrated on an integrated circuit, and wherein the fourth power supply comprises:
    regulator circuitry integrated on the integrated circuit.

3. The circuitry defined in claim 2 wherein the receiver circuitry further includes charge pump circuitry, and wherein the circuitry further comprises:
    further regulator circuitry integrated on the integrated circuit for supplying power to the charge pump circuitry.

4. The circuitry defined in claim 3 wherein the regulator circuitry and the further regulator circuitry are supplied with power from a common source.

5. The circuitry defined in claim 1 further comprising second transceiver circuitry, which includes second receiver circuitry and second transmitter circuitry including second transmitter driver circuitry, and wherein the first power supply circuitry additionally supplies power to the second receiver circuitry, the second power supply circuitry additionally supplies power to the second transmitter circuitry other than the second transmitter driver circuitry, and the third power supply circuitry additionally supplies power to the second transmitter driver circuitry.

6. The circuitry defined in claim 5 wherein the receiver circuitry and the second receiver circuitry respectively include first and second voltage-controlled oscillator circuits, and wherein the circuitry further comprises:
    first and second regulator circuits for respectively supplying power to the first and second voltage-controlled oscillator circuits.

7. The circuitry defined in claim 6 further comprising:
    fourth power supply circuitry for supplying power to the first and second regulator circuits.

8. The circuitry defined in claim 7 wherein the receiver circuitry, the transmitter circuitry, the second receiver circuitry, the second transmitter circuitry, and the first and second regulator circuits are integrated on an integrated circuit.

9. An integrated circuit comprising:
    a plurality of channels of transceiver circuitry, each including receiver circuitry and transmitter circuitry having transmitter driver circuitry, wherein the receiver circuitry comprises voltage-controlled oscillator circuitry; and
    first, second, and third separate power distribution conductor networks for respectively supplying power to the receiver circuitries, the transmitter circuitries other than the transmitter driver circuitries, and the transmitter driver circuitries; and
    power supply circuitry for supplying power to the voltage-controlled oscillator circuitry.

10. The integrated circuit defined in claim 9 wherein the power supply circuitry comprises:
    regulator circuitry associated with each of the voltage controlled oscillator circuitries.

11. The integrated circuit defined in claim 10 further comprising:
    a fourth separate power distribution conductor network for supplying power to all of the regulator circuitries.

12. The integrated circuit defined in claim 10 wherein each of the receiver circuitries includes charge pump circuitry, and wherein the power supply circuitry further comprises:
    further regulator circuitry associated with each of the charge pump circuitries for supplying power to the associated charge pump circuitry.

13. The integrated circuit defined in claim 12 further comprising:
  a fourth separate power distribution conductor network for supplying power to all of the regulator and further regulator circuitries.

14. The integrated circuit defined in claim 9 wherein the third power distribution conductor network comprises a separate subnetwork associated with each of the transmitter driver circuitries for supplying power to the associated transmitter driver circuitry.

15. A system including an integrated circuit as defined in claim 9 and further comprising:
  first, second, and third separate power supplies for respectively supplying power to the first, second, and third power distribution conductor networks.

16. The system defined in claim 15 wherein the power supplies are not integrated on the integrated circuit.

17. An integrated circuit comprising:
  a plurality of channels of transceiver circuitry, each including (1) receiver circuitry having charge pump and voltage-controlled oscillator circuitry, and (2) transmitter circuitry having transmitter driver circuitry;
  a first power distribution conductor network for supplying power to all of the receiver circuitries other than the charge pump and voltage-controlled oscillator circuitries;
  a second power distribution conductor network for supplying power to all of the charge pump and voltage controlled oscillator circuitries;
  a third power distribution conductor network for supplying power to all of the transmitter circuitries other than the transmitter driver circuitries; and
  a fourth power distribution conductor network for supplying power to the transmitter driver circuitries, wherein the first through fourth power distribution conductor networks are all separate from one another.

18. The integrated circuit defined in claim 17 wherein the second power distribution conductor network comprises:
  separate regulator circuitry for supplying power to each of the charge pump and voltage-controlled oscillator circuitries.

19. The integrated circuit in claim 17 wherein the transmitter driver circuitries are grouped in a plurality of groups of the transmitter driver circuitries, and wherein the fourth power distribution conductor network comprises a plurality of subnetworks, each of which supplies power to a respective one of the groups.

* * * * *

UNITED STATES PATENT AND TRADEMARK OFFICE
CERTIFICATE OF CORRECTION

| | | |
|---|---|---|
| PATENT NO. | : 7,639,993 B1 | Page 1 of 1 |
| APPLICATION NO. | : 11/295391 | |
| DATED | : December 29, 2009 | |
| INVENTOR(S) | : Shumarayev et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Ninth Day of November, 2010

David J. Kappos
*Director of the United States Patent and Trademark Office*